(12) United States Patent
Schwarz

(10) Patent No.: US 11,536,669 B2
(45) Date of Patent: Dec. 27, 2022

(54) DETECTING MACHINING ERRORS OF A LASER MACHINING SYSTEM USING DEEP CONVOLUTIONAL NEURAL NETWORKS

(71) Applicant: Precitec GmbH & Co. KG, Gaggenau (DE)

(72) Inventor: Joachim Schwarz, Kleinandelfingen (CH)

(73) Assignee: PRECITEC GMBH & CO. KG, Gaggenau (DE)

( * ) Notice: Subject to any disclaimer, the term of this patent is extended or adjusted under 35 U.S.C. 154(b) by 0 days.

(21) Appl. No.: 17/295,938

(22) PCT Filed: Oct. 10, 2019

(86) PCT No.: PCT/EP2019/077481
§ 371 (c)(1),
(2) Date: May 21, 2021

(87) PCT Pub. No.: WO2020/104102
PCT Pub. Date: May 28, 2020

(65) Prior Publication Data
US 2022/0011240 A1 Jan. 13, 2022

(30) Foreign Application Priority Data
Nov. 22, 2018 (DE) .................. 102018129425.5

(51) Int. Cl.
*G01N 21/88* (2006.01)
*G01N 21/95* (2006.01)
(Continued)

(52) U.S. Cl.
CPC ....... *G01N 21/8851* (2013.01); *B23K 26/032* (2013.01); *G01B 9/02091* (2013.01);
(Continued)

(58) Field of Classification Search
CPC .............. G01N 21/8851; G01N 21/95; G01N 29/4481; B23K 26/032; B23K 31/006;
(Continued)

(56) References Cited

U.S. PATENT DOCUMENTS

2012/0318775 A1* 12/2012 Schwarz .............. B23K 26/032
356/606
2013/0223724 A1 8/2013 Wersborg et al.
(Continued)

FOREIGN PATENT DOCUMENTS

CN 108346151 A 7/2018
DE 19957163 C1 8/2001
(Continued)

OTHER PUBLICATIONS

Khumaidi Agus et al: 1 Welding defect classification based on convolution neural network (CNN) and Gaussian kernel11 , 2017 International Seminar on Intelligent Technology and Its Applications (ISITIA), IEEE, Aug. 28, 2017 (Aug. 28, 2017), Seiten 261-265, XP033272611.
International Search Report dated Feb. 4, 2020; International Application PCT/EP2019/077481.

*Primary Examiner* — Jamil Ahmed
(74) *Attorney, Agent, or Firm* — Dinsmore & Shohl LLP

(57) ABSTRACT

A system for detecting machining errors for a laser machining system for machining a workpiece includes: a detection unit for detecting image data and height data of a machined workpiece surface; and a computing unit. The computing unit is designed to generate an input tensor based on the detected image data and height data and to determine an output tensor on the basis of the input tensor using a transfer function. The output tensor contains information on a machining error.

11 Claims, 6 Drawing Sheets

(51) Int. Cl.
*B23K 26/03* (2006.01)
*G06T 7/00* (2017.01)
*G01B 9/02091* (2022.01)
*G01N 29/44* (2006.01)
*G06T 17/30* (2006.01)

(52) U.S. Cl.
CPC ......... *G01N 21/95* (2013.01); *G01N 29/4481* (2013.01); *G06T 7/0004* (2013.01); *G06T 17/30* (2013.01); *G05B 2219/33044* (2013.01); *G06T 2207/30164* (2013.01)

(58) Field of Classification Search
CPC ... G01B 9/02091; G06T 7/0004; G06T 17/30; G06T 2207/30164; G05B 2219/33044
See application file for complete search history.

(56) References Cited

U.S. PATENT DOCUMENTS

2015/0001196 A1* 1/2015 Kim ................ B23K 26/26
219/121.83
2017/0270434 A1 9/2017 Takigawa et al.

FOREIGN PATENT DOCUMENTS

| DE | 10335501 B4 | 1/2005 |
| DE | 102008058422 A1 | 5/2010 |
| DE | 102011104550 B4 | 4/2014 |
| DE | 102014113283 B4 | 11/2016 |

* cited by examiner

DETECTING MACHINING ERRORS OF A LASER MACHINING SYSTEM USING DEEP CONVOLUTIONAL NEURAL NETWORKS

CROSS-REFERENCE TO RELATED APPLICATIONS

This application is the U.S. National Stage of PCT/EP2019/077481 filed Oct. 10, 2019, which claims priority to German Patent Application No. 10 2018 129 425.5, filed Nov. 22, 2018, the entire content of both are incorporated herein by reference in their entirety.

FIELD OF THE INVENTION

The present disclosure relates to a system for recognizing a machining error for a laser machining system for machining a workpiece and a machining system for machining a workpiece by means of a laser beam, said machining system including such a system for recognizing a machining error. The present disclosure also relates to a method for recognizing a machining error in a laser machining system for machining a workpiece.

BACKGROUND AND STATE OF THE ART

In a machining system for machining a workpiece by means of a laser beam, the laser beam exiting from a laser light source or an end of a laser optical fiber is focused or collimated onto the workpiece to be machined by means of a beam guiding and focusing optics. The machining may include, for example, laser cutting, soldering or welding. The laser machining system may for example comprise a laser machining head.

In particular for laser welding or soldering a workpiece, it is important to inspect or evaluate the quality of the connection created. Current solutions for quality evaluation in laser welding and soldering usually comprise a so-called post-process inspection.

The post-process inspection of welded or soldered seams is typically carried out by means of image processing, wherein 2D images showing the welded or soldered seams on the surface of a machined workpiece are analyzed. The aim of the post-process inspection is to reliably localize and identify all defects. In image processing terminology, welded and soldered seam surfaces consist of stochastic or deterministic textures. It is also possible that 3D data of the machined workpiece surface are acquired in order to determine the geometry data of the welded joint. Which geometry data has to be acquired and evaluated is stipulated in the respective standards. For laser welding tailored blanks, this is, for example, the SEL 100 standard. The extraction and assessment of the 2D and 3D data are usually carried out separately.

Significant features representing or describing the quality of the welded and soldered seams are extracted or calculated from the data. The final assessment of the machining quality is performed by parameterization of the feature calculation and parameterization of the calculated characteristic features of the textures. In the simplest case, these are threshold values between which value characterizing the feature has to be. For example, local defects or machining errors, such as holes or pores in the workpiece surface, are detected via local deviations from the target geometry (locally extremely deep or high areas of the workpiece surface).

Thus, extraction and classification of features characterizing the machining quality are performed. On the basis of the extracted and classified features, machining errors are detected and classified and the machined workpiece is labeled or classified, for example, as "good" (i.e., suitable for further machining or sale) or as "bad" (i.e., as scrap). Which significant features can be used for the evaluation of the quality of laser machining at all and what kind of influence these features then have on the evaluation of the quality can only be decided and implemented by experts in the field, since the complexity of these systems is very high due to the number of parameters to be adjusted. In current systems, up to 300 parameters are adjusted for this purpose. However, these settings can only be adjusted by experts who acquired extensive knowledge.

This analysis of the textures is also complex because the features characterizing the quality depend heavily on the material used, the laser power applied, the welding speed and much more. This means that the extraction and evaluation or classification of the features must be adjusted via parameters. Adjusting laser machining to a new material or a change in the machining process changing the surface texture requires changes in the algorithms and the parameters of the image processing. Every adjustment of the laser machining, for example through a product change, requires the parameters to be set or readjusted again.

Accordingly, the training of experts is complex and lengthy. In addition, setting and readjusting the parameters requires long production interruptions in the manufacture at the customers of the laser machining systems. In addition, the risk of incorrect parameterization is high.

It is therefore an object of the invention to simplify the assessment of the quality of laser machining. It is also an object of the invention to detect machining errors reliably and quickly without complex parameterization processes.

Furthermore, it is an object of the invention to provide a system which automates the assessment of the quality of laser machining and the detection of machining errors and thus allows for process monitoring.

It is also an object of the invention to provide a system, wherein an assessment of the quality of a laser machining and the detection of machining errors can be adapted quickly and easily to changed circumstances or a changed situation, such as a changed machining process or a different workpiece material.

Furthermore, it is an object of the invention to provide a system, wherein the quality of laser machining and the detection of machining errors are assessed based on raw data acquired from a machined workpiece surface (so-called "end-to-end" machining or analysis).

SUMMARY OF THE INVENTION

These objects are achieved by the subject matter disclosed herein. Advantageous embodiments and further developments are also disclosed.

The invention is based on the idea that the quality of laser machining and the detection of machining errors are assessed based on image and height data of a machined workpiece surface.

According to an aspect of the present disclosure, a system for detecting a machining error for a laser machining system for machining a workpiece is provided, said system comprising: an detection unit for detecting image data and height data of a workpiece surface; and a computing unit, said computing unit being configured to determine, using a transfer function, an output tensor containing information about a machining error from an input tensor based on the detected image data and height data.

Accordingly, the system is able to independently detect whether there is a machining error in a workpiece machined by the laser machining system.

In other words, the quality of a machining process of the machining system can be determined on the basis of the information about the machining error. The simultaneous processing of image and height data can make the evaluation more reliable, compact and fast.

The detection unit may comprise an image detection unit for detecting the image data. The detection unit may further comprise a height detection unit for detecting the height data. The image detection unit and the height detection unit may each comprise at least one corresponding sensor.

The image detection unit preferably comprises a camera system, in particular a 2D and/or 3D camera system, preferably with incident-light LED lighting. More preferably or alternatively, the height detection unit comprises a triangulation system and/or an OCT ("optical coherence tomography") system.

According to an embodiment, the height detection unit may also determine, e.g. by means of the OCT system, a distance to the workpiece surface, e.g. a distance between the machining head of the laser machining system and the workpiece surface, and determine the height data on the basis of the distance.

The detection unit may also comprise one or more sensors configured to detect both image data and height data, for example a stereo camera system, preferably with LED lighting.

The image data preferably correspond to a two-dimensional image or a two-dimensional imaging of a section of the machined workpiece surface. The height data may correspond to a three-dimensional height geometry of the same section of the surface. In other words, the image data may represent a two-dimensional image of a section of the machined workpiece surface and the height data may represent a three-dimensional height or surface geometry of the same section of the surface.

The image data may therefore comprise pixel data of an image or a photo of a section of the machined workpiece surface, preferably of a section of the workpiece surface previously machined by the laser machining system. The height data may comprise height values for each pixel of the same section of the machined workpiece surface. The image data and the height data may be scaled equivalently.

The detection unit and/or the computing unit is preferably configured to process the image data and the height data in such a way that, for each pixel of the image showing an area of the section, a height value of the height data of the same area exists. The height value of an area or point on the workpiece surface may specify a distance of this area or point from a reference plane preferably extending in parallel to the workpiece surface.

The detection unit may be configured to generate a two-channel image from the height data and image data.

Accordingly, the two-channel image may contain pixel data and height values of the workpiece surface corresponding to the pixel data. Each pixel may represent brightness information or gray levels based on an optical image of the workpiece surface.

The image data and/or the height data may comprise n×m values, where n and m are natural numbers. The input tensor may comprise n×m×2 values. In other words, the input tensor may have a dimension corresponding to twice a number of image data. The input tensor may therefore have twice as many values as an image of the workpiece surface. For example, the image may have 1024×1024 pixels.

Furthermore, the input tensor may contain control data of the laser machining system. In this case, the dimension of the input tensor may increase accordingly. The control data may include at least one value indicating the output power of a laser of the laser machining system, a set focus position of the laser beam, a machining speed, or the like, at a given point in time during the machining of the workpiece.

In the simplest case, the output tensor may contain the information as to whether a machining of a workpiece is good or bad. Based on this information, the machined workpiece may be subjected to further machining or sold or may be marked as scrap and no longer used. The aim of this so-called post-machining inspection of the workpiece by the system provided is therefore to detect all relevant machining errors or defects as far as possible.

Furthermore, the system is able to indicate the type, position and/or size of a machining error present on a surface of the workpiece.

Therefore, the output tensor may contain at least one of the following pieces of information: presence of a machining error, type of the machining error, position of the machining error on the workpiece surface, probability that a machining error of a certain type has occurred, and/or a spatial and/or planar extent of the machining error on the workpiece surface.

The type of machining error may be at least one of the following: pores, holes, lack of penetration through the workpiece, a false friend, spatter, or a gap.

Typically, the system detects errors at a location on the workpiece that has already been machined. The computing unit is thus configured to determine the output tensor while the workpiece is being machined by the laser machining system or after the machining has been completed.

This makes it possible to determine whether one or more machining errors occurred when the workpiece was machined by the laser machining system, what spatial extent these one or more errors have, or at which position(s) on the workpiece surface these one or more errors are located. In addition, the output tensor may contain information about the degree of certainty or confidence with which the system determined the presence of one or more errors.

The transfer function between the input tensor and the output tensor is preferably formed by a (pre-)taught or trained neural network. In other words, the computing unit may comprise a neural network. The neural network may have been trained by error feedback or backpropagation.

The computing unit preferably has an interface configured to receive training data for training or adapting the neural network. The machining unit may in particular be configured to adapt the neural network by means of transfer learning, e.g. based on training data. In addition, the machining unit may receive control data, which also go into the input tensor for transfer learning, from the laser machining system via the interface.

The training data may include predetermined input tensors based on image data and height data of a machined workpiece surface detected by the detection unit and predetermined output tensors associated with the respective input tensors, said output tensors containing information about a machining error in the machined workpiece surface, e.g. identified by an expert. As a result, the neural network forming the transfer function can be adapted to a changed situation. In other words, the transfer function is modified. The changed situation may include, for example, that the workpieces to be machined have different materials, different degrees of soiling and/or thicknesses, or that the parameters of the laser machining change.

In transfer learning, a training data set used for training or teaching the neural network or a reduced training data set may be supplemented with new examples.

The use of a trained neural network configured for transfer learning in the system for detecting machining errors according to the aspects described herein thus has the advantage that the system can be quickly adapted to changed situations.

The neural network may be a deep neural network, e.g. a deep convolutional network or convolution network. The convolution network may include between 20 and 40 convolution layers, preferably 42 convolution layers. In addition, the convolution network may include a so-called "fully connected" layer.

According to a further aspect of the disclosure, a laser machining system for machining a workpiece by means of a laser beam is provided, said machining system comprising a laser machining head for radiating a laser beam onto a workpiece to be machined and a system for detecting a machining error according to one of the aspects described herein. The detection unit is preferably arranged on the laser machining head.

According to a further aspect, a method for detecting a machining error of a laser machining system for machining a workpiece is provided, said method comprising the steps of: detecting image data and height data of a surface of the workpiece; forming an input tensor based on the detected image data and height data; and determining an output tensor containing information about a machining error in a machining process based on the input tensor and by means of a transfer function.

In general, the use of a neural network forming the transfer function has the advantage that the system can independently recognize whether and which machining errors are present. Accordingly, it is no longer necessary for the detected sensor data, such as the image and height data, to be preprocessed in order to be accessible for error detection. Furthermore, it is not necessary to extract features characterizing the machining quality or any machining errors from the detected data.

In addition, it is not necessary to decide which extracted features are necessary or relevant for the assessment of the machining quality or the classification of the machining errors. It is also not necessary to specify or adjust a parameterization of the extracted features to classify the machining errors.

The determination or assessment of the machining quality or the machining errors by the laser machining system is thereby simplified. The steps mentioned do not have to be carried out or attended by experts in laser machining. The system for detecting machining errors according to the aspects disclosed herein carries out the assessment or classification of the machining quality or the machining errors independently, i.e. automatically, and can be easily adapted.

BRIEF DESCRIPTION OF THE DRAWINGS

The invention is described in detail below with reference to figures. In the figures.

DETAILED DESCRIPTION

Unless otherwise noted, the same reference symbols are used hereinafter for elements that are the same and have the same effect.

Figure 1:
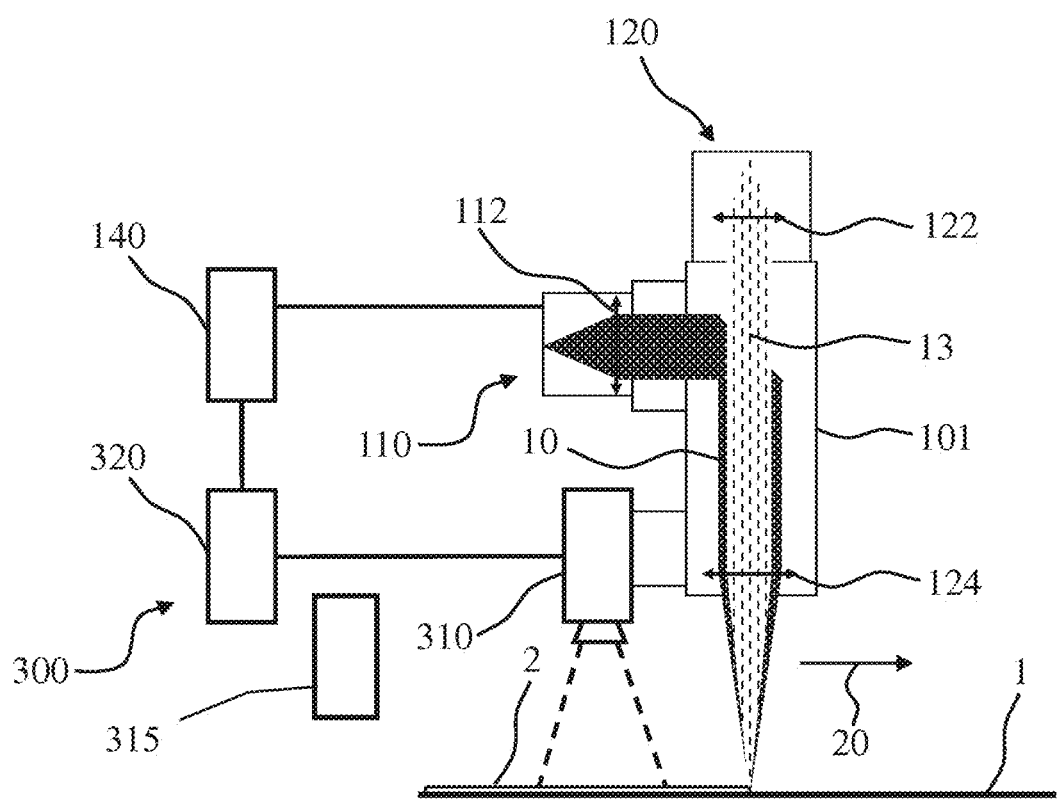
FIG. 1 shows a schematic diagram of a laser machining system for machining a workpiece by means of a laser beam and a system for detecting machining errors according to an embodiment.

FIG. 1 shows a schematic diagram of a laser machining system 100 for machining a workpiece by means of a laser beam according to embodiments of the present disclosure. The laser machining system 100 comprises a laser machining head 101, in particular a laser cutting, laser soldering or laser welding head, and a system 300 for detecting machining errors.

The laser machining system 100 comprises a laser apparatus 110 for generating a laser beam 10 (also referred to as a "machining beam" or "machining laser beam").

The laser machining system 100 or parts thereof, such as, for example, the machining head 101, may, according to embodiments, be movable along a machining direction 20. The machining direction 20 may be a cutting, soldering or welding direction and/or a movement direction of the laser machining system 100, such as the machining head 101, with respect to the workpiece 1. In particular, the machining direction 20 may be a horizontal direction. The machining direction 20 may also be referred to as a "feed direction".

The laser machining system 100 is controlled by a control unit 140 configured to control the machining head 101 and/or the laser apparatus 110.

The system 300 for detecting machining errors comprises a detection unit 310 and a computing unit 320. The detection unit 310 is configured to detect image data and height data of a machined surface 2 of the workpiece 1. According to an embodiment, the detection unit 310 is arranged on the machining head 101. For example, the detection unit may be arranged downstream on the machining head 101 with reference to the machining direction 20.

The computing unit 320 is configured to receive the image data and height data of the machined workpiece surface 2 detected by the detection unit 310 and to form an input tensor based on the image data and height data. The computing unit 320 is further configured to then determine an output tensor containing information about a machining error on the basis of the input tensor by means of a transfer function accessible to the computing unit 320. In other words, the output tensor may be the result of one or more arithmetic operations and contain information about whether and which error(s) have occurred when the workpiece 1 was machined by the laser machining system 100. Furthermore, the output tensor may contain information about the type, position and size of the error on the workpiece surface 2.

According to one embodiment, the computing unit 320 is combined with the control unit 140 (not shown). In other words, the functionality of the computing unit 320 may be combined with that of the control unit 140 in a common processing unit.

The laser machining system 100 optionally includes a measuring device 120 for measuring a distance between an end portion of the machining head 101 and a workpiece 1 to be machined. The measuring device may include an optical coherence tomograph, in particular an optical low-coherence tomograph.

The laser apparatus 110 may include a collimator lens 112 for collimating the laser beam 10. The coherence tomograph may include a collimator optics 122 configured to collimate an optical measuring beam 13 and a focusing optics 124 configured to focus the optical measuring beam 13 onto the workpiece 1. In the present disclosure, the distance measurement is based on the principle of optical coherence tomography, which makes use of the coherence properties of light with the aid of an interferometer. The optical coherence tomograph may include an evaluation unit with a broadband light source (e.g., a superluminescent diode, SLD) (not shown). However, the laser apparatus 110 is not limited to this arrangement. Instead of an optical coherence tomograph, the measuring device may also use a triangulation system or a stereo camera.

Figure 2:
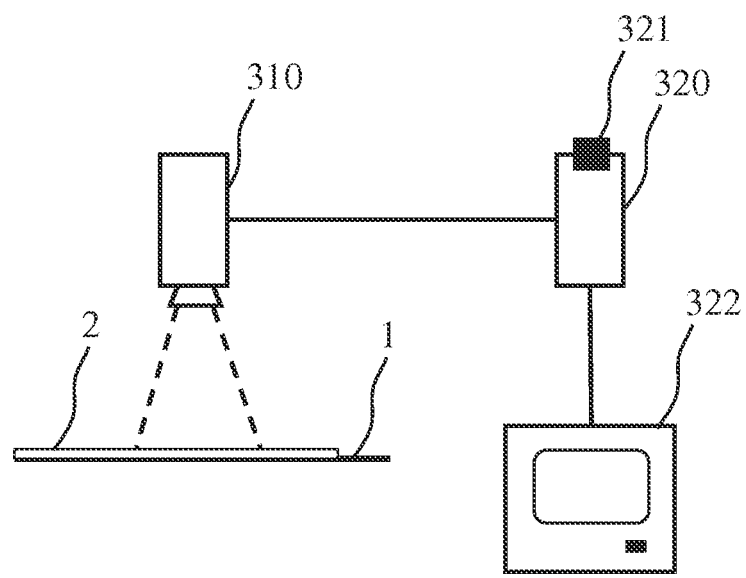
FIG. 2 shows a block diagram of a system for detecting machining errors according to an embodiment.

FIG. 2 shows a block diagram of the system 300 for detecting a machining error according to an embodiment.

The system 300 comprises the detection unit 310 and the computing unit 320. The detection unit 310 and the computing unit 320 are connected to each another, so that the computing unit 320 can receive the image data and height data detected by the detection unit 310.

The detection unit 310 may include at least one of the following elements: a stereo camera system configured to detect and output both image data and height data of a machined workpiece surface 2; a camera system, e.g. with incident-light LED lighting, a triangulation system, or an OCT system.

According to an embodiment, the detection unit 310 comprises an image detection unit 310 configured to detect image data from the machined workpiece surface 2 and a height detection unit, such as shown separately at 315, configured to detect height data from the machined workpiece surface 2. The image detection unit may comprise a camera system, for example with incident-light LED lighting. The height detection unit may comprise a triangulation system or an OCT system, i.e., an "optical coherence tomography" system or a system based on optical coherence tomography.

According to the invention, the image data correspond to a two-dimensional image of a section of the machined workpiece surface 2. In other words, the detected or captured image data represent a two-dimensional image of the machined workpiece surface 2, as shown by way of example in FIG. 3B and described in detail below. The height data correspond to a three-dimensional height geometry of a section of the machined workpiece surface 2, as shown by way of example in FIG. 3A and described in detail below. The image data and the height data preferably include data about the same section of the machined workpiece surface 2.

According to an embodiment, the computing unit 320 includes a processor for determining the output tensor. The transfer function is typically stored in a memory (not shown) of the computing unit 320 or implemented as a circuit, for example as an FPGA. The memory may be configured to store further data, for example the determined output tensor.

The computing unit 320 may include an input/output unit 322, which may in particular include a graphical user interface for interacting with a user. The computing unit 320 may have a data interface 321 via which the computing unit can transmit the output tensor to an external location, such as a further computing unit, computer, PC, an external storage unit, such as a database, a memory card or a hard drive. The computing unit 320 may further include a communication interface (not shown) with which the computing unit can communicate with a network. Furthermore, the computing unit 320 may graphically display the output tensor on the output unit 322.

The computing unit 320 creates an input tensor for a transfer function from the image data and height data detected by the detection unit 310. The image data and height data are described in detail below with reference to FIGS. 3A and 3B.

The computing unit 320 may further be configured to receive control data from the control unit 140 of the laser machining system 100 via the interface 321 and also to incorporate the control data into the input tensor. The control data may include, for example, the output power of the laser apparatus 110, the distance between the machining head 101 and the surface of the workpiece 1, the feed direction and speed, in each case at a given point in time.

The transfer function is formed by a taught, i.e. pre-trained, deep convolutional neural network. In other words, the computing unit includes the deep convolutional neural network. The output tensor is formed by applying the transfer function to the input tensor. Using the transfer function, the output tensor is thus determined from the input tensor.

The output tensor contains information or data about at least one machining error. This information or data may be: whether there is at least one machining error, the type of the at least one machining error, the position of the machining error on the surface of the machined workpiece 1 and/or the size or extent of the machining error.

According to an embodiment, the output tensor may also contain the probability that a machining error of a certain type has occurred or the confidence that the system has detected a machining error of a certain type. In addition, the output tensor may include information or data about the spatial or planar extent of the machining defect on the surface of the machined workpiece.

According to an embodiment, the computing unit 320 may be configured to graphically display the input tensor and/or the output tensor on the output unit 322. For example, the computing unit 320 may graphically display the image data and/or the height data contained in the input tensor, as shown in FIG. 3A or 3B, as two-dimensional images of the machined workpiece surface 2 and superimpose the information about a machining error contained in the output tensor thereon.

Figure 3A:
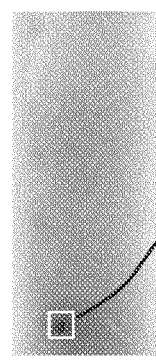
FIGS. 3A and 3B show illustrations of exemplary image data and height data.
Figure 3B:
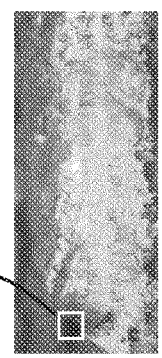

FIG. 3A shows a representation of elevation data and FIG. 3B shows a representation of image data according to an embodiment. FIG. 3A shows an exemplary height image of a soldered seam recorded with a triangulation sensor. FIG. 3B shows an exemplary incident-light image of the soldered seam recorded with the aid of LED incident-light illumination.

According to an embodiment, the image data and height data detected by the detection unit 310 or the image detection unit and the height detection unit may be created from a recording of a section of the machined workpiece surface and a corresponding height image. The recording may be a two-dimensional image or photo, which is preferably made under LED incident-light illumination and is referred to as an "incident-light image". The height image may represent the height geometry or the height profile of the section of the machined workpiece surface. It therefore contains information about the three-dimensional shape of the machined workpiece surface.

In FIG. 3A, different gray values represent different height values of the machined workpiece surface 2, as described in detail below. In FIG. 3B, different gray values represent different brightness values of the machined workpiece surface 2 generated by reflection of light, for example by LED incident-light illumination. The frames 2a, 2b represent the size and position of a detected machining error, as they are contained as information in the output tensor determined by the computing unit 320.

In the height image, each brightness or gray value corresponds to a distance value from a plane parallel to the workpiece surface; in the incident-light image, each brightness or gray value corresponds to the intensity of the light reflected back onto a photo sensor of the detection unit or the image detection unit.

According to an embodiment, the incident-light image and the height image are scaled in such a way that their dimensions are the same. In other words, according to an embodiment, the incident-light image and the height image show recordings of the same section of the machined workpiece surface. As described above, the images may be recorded by separate recording systems.

According to an embodiment, the incident-light image may be created in a triangulation evaluation from the intensity of a triangulation line and its surroundings. This creates an incident-light image of an area of the workpiece surface within or around the triangulation line by capturing the reflected scattered light of the triangulation line. If a plurality of these incident-light images are put together, a gray value image is created. The resolution of the gray value image created in this way in the feed direction of the triangulation system depends on the scan rate of the triangulation system.

According to an embodiment, the recording and the height image are combined to form a two-channel image. Accordingly, the input tensor created by the computing unit 320 may contain a recording or an image of a section of the machined workpiece surface with a resolution of n*m pixels, where n and m are natural numbers, preferably 1024 each. That means the image consists of 1024*1024 pixels. The input tensor may also include a height value as height data for each pixel. This means that the input tensor contains the two-channel image with a dimension of 1024*1024*2. The two-channel image thus contains a brightness value and a height value for each pixel, the pixel corresponding to an area of the section of the workpiece surface.

The computing unit 320 determines the output tensor based on the input tensor using a transfer function. The transfer function or mapping of the output tensor to the input tensor is implemented by a deep convolutional neural network, as is described in detail below with reference to FIGS. 4A and 4B.

Figure 4A:
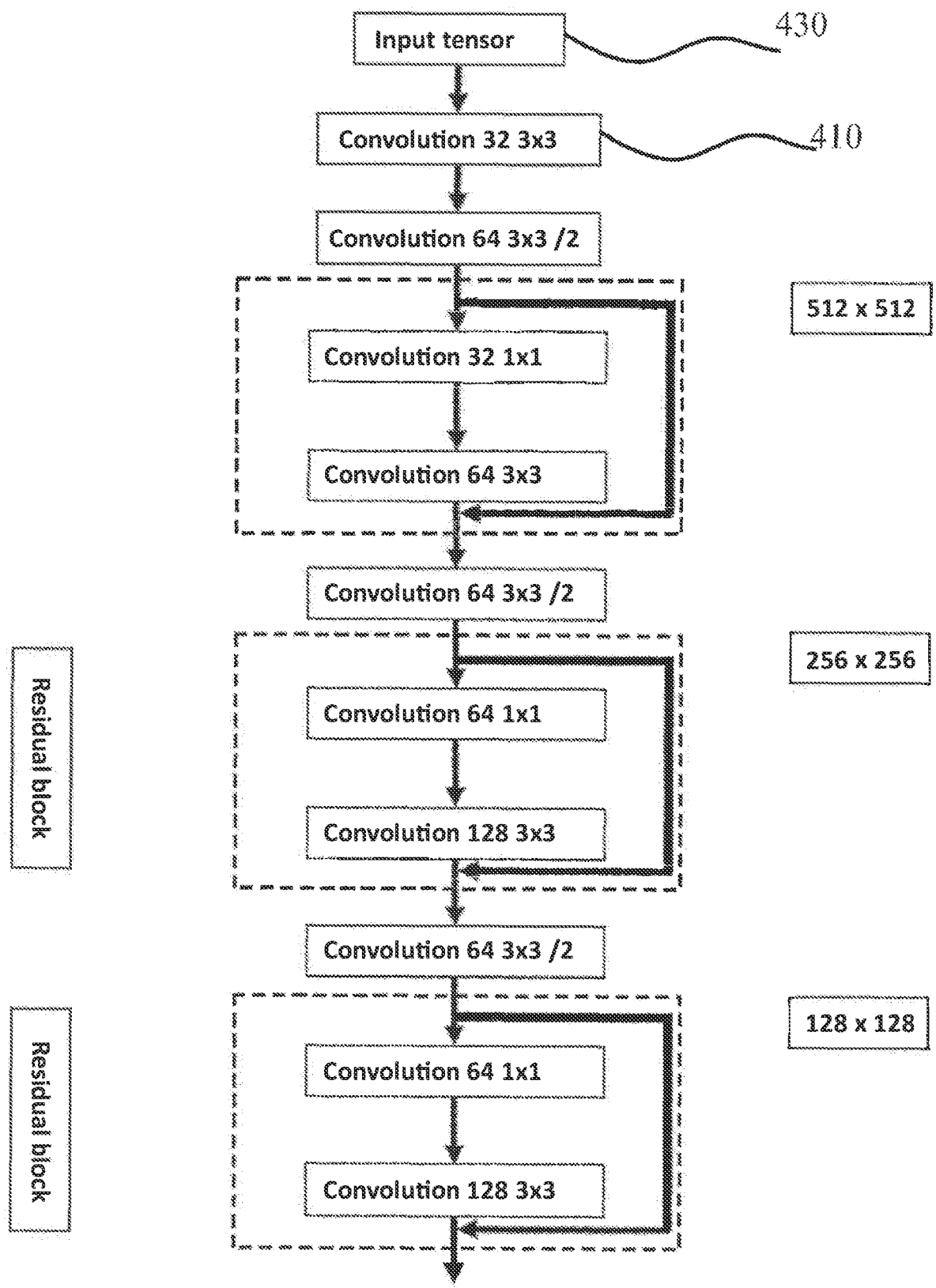
FIG. 4 shows a block diagram of a deep convolutional neural network according to an embodiment.
Figure 4B:
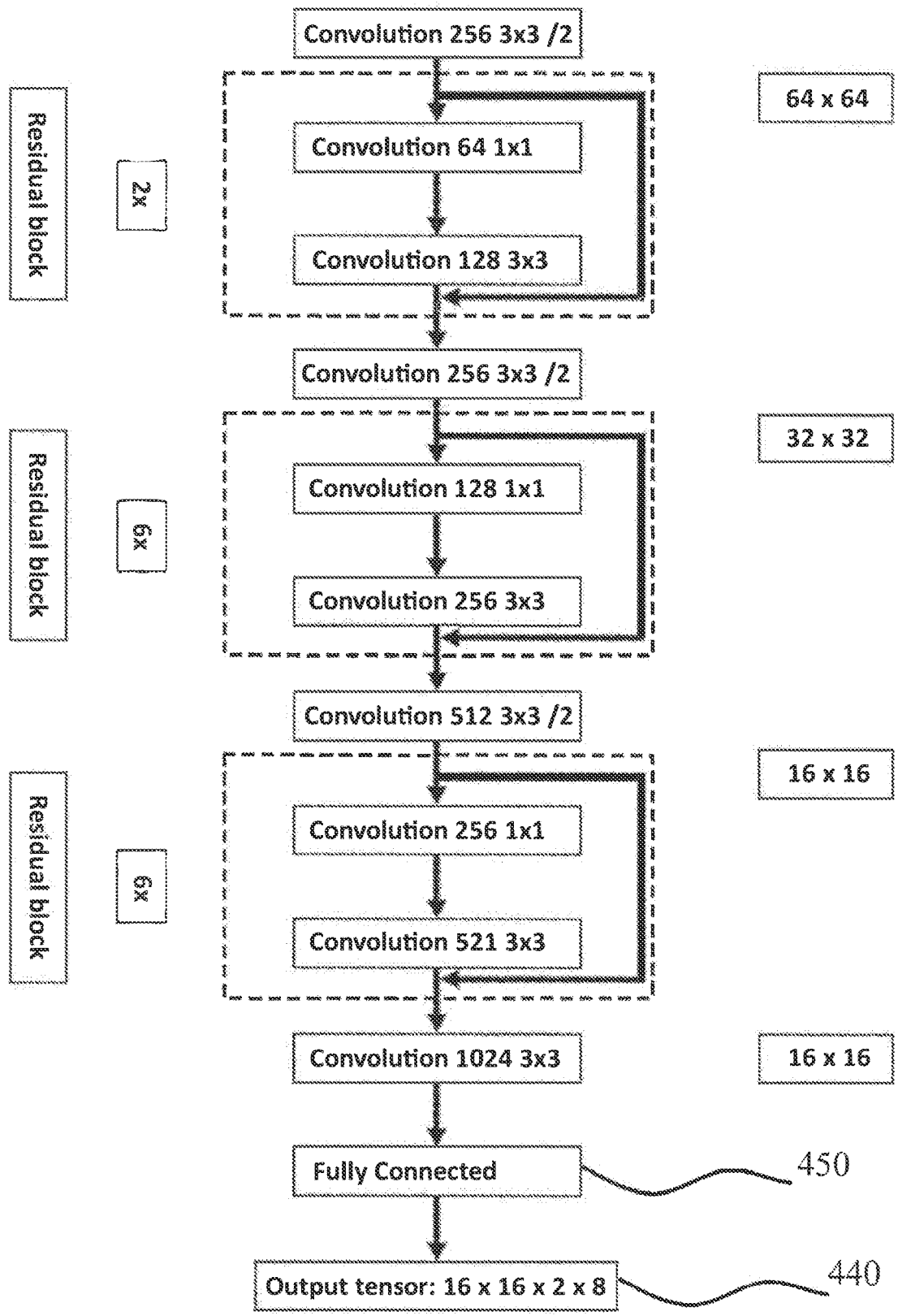

FIGS. 4A and 4B show a block diagram of a deep convolutional neural network 400 according to an embodiment.

The input tensor contains the detected raw data including the image data and height data. As described above, the input tensor may be created from a 2-channel image consisting of an incident-light image and a height image. These image data and height data directly form the input tensor of the deep convolutional neural network. This means that a so-called "end-to-end" mapping or analysis is performed between the input tensor and the output tensor. Thus, no features are calculated or parameterized in an intermediate step.

The deep convolutional neural network 40, abbreviated to "CNN" in the following, comprises a plurality of layers 410 which perform convolution with a plurality of cores. Furthermore, the CNN 400 may include a so-called "fully connected" layer or block 450.

The CNN may preferably use the so-called You Only Look Once method in order to enable rapid detection and localization of machining errors with an indication of the size of the machining errors or defects.

According to an embodiment, the CNN is configured to detect pores (error "a"), holes (error "b") and missing weld penetration (error "c") during the machining of a workpiece 1. This means the classification of the possible machining errors into 3 classes. The classification result should have the values Pc (error present/not present or the probability of an error being present), Ca (probability of error "a"), Cb (probability of error "b"), Cc (probability of error "c"), as well as the values x, y, dx, dy (location and size of the respective error). Here, the values x and y represent coordinates in a two-dimensional Cartesian coordinate system with an x-axis and a y-axis, the plane of the two-dimensional Cartesian coordinate system being arranged parallel to the workpiece surface. The values dx, dy accordingly represent the extent or size of the error in the x and y directions.

In the case of an input tensor 430 according to an embodiment of the dimension 1024*1024*2, i.e. an incident-light image of the size 1024*1024 pixels and a height value for each of the pixels, the CNN comprises an input layer with 1024*1024*2 neurons. So-called grids or rasters, for example with a size of 64*64 pixels per raster cell, are placed over the incident-light image. This results in an output layer with 16*16*8 neurons, that is, the output tensor also has the dimension 16*16*8.

For example, the incident-light and height image is divided into 256 grid or raster cells. From the output tensor, the neural network thus determines the classification result for each of the 256 grid cells, including 8 values per grid cell. From these 8 values, the result of the classification or assessment of the machined workpiece surface for each grid cell can be taken in by the neural network. According to an embodiment, the procedure is such that first the value Pc, that is, the indication of whether or not there is an error in the corresponding grid cell, is taken into account. If there is an error, the values Ca, Cb and Cc are examined next. This means that it is examined how high the probability of whether the error "a", the error "b" or the error "c" is present is. Finally, the values for the position and size of the error, x, y, dx, dy, are examined. A quick classification or further processing of the output tensor can be ensured by means of this graded or step-by-step approach.

From the examination of the output tensor or the values contained therein, the machined workpiece may in turn be classified as "good" or "bad" using a predefined classification algorithm. In other words, depending on the situation, the workpiece may be classified as suitable for sale or further machining ("good") or as scrap or marked for post-machining ("bad").

According to another exemplary embodiment, at least 2 framed rectangles, so-called "bounding boxes", are calculated for each grid or raster cell with an associated probability. One object each is localized for each framed rectangle and the probability for each error class is calculated. This gives an output layer with 16*16*2*8 neurons. That is, the output tensor 440 also has the dimension 16*16*2*8.

For each raster cell, there is a vector y with the content y=(Pc1, x1, y1, dx1, dy1, Ca1, Cb1, Cc1; Pc2, x1, x2, dx2, dy2, Ca2, Cb2, Cc2). The index "1" stands for one of the two framed rectangles, the index "2" for the other of the two framed rectangles. If, in a grid cell, both framed rectangles have a probability Pc that is greater than a predefined threshold value, according to one embodiment that rectangle having a larger "IoU value" is selected. The IoU value describes the intersection in relation to the union of a framed rectangle.

The classification result may be read directly from the output tensor of the network, e.g., using a "non-max suppression" method. The training of the network is supported by GPUs. The inference is performed via FPGAs in a camera or a plug-in card in the computing unit 320 with FPGAs (not shown).

As shown in FIGS. 4A and 4B, the CNN comprises, for example, 42 convolution layers, with at least some convolution layers comprising a normalization (batch normalization) and so-called residual blocks.

By normalizing the outputs of a layer, the problem of "exploding" or "vanishing" gradients can be avoided. The behavior in the inference process is less sensitive to data of other distributions.

The normalization usually includes the mean value and the standard deviation over a "mini batch". The effect thereof is regulation.

According to an embodiment, these parameters are used as hyperparameters in the trained network: "Batch Normalization", "Accelerating Deep Network Training by Reducing Internal Covariate Shift" (according to Sergey Ioffe, Christian Szegedy).

In FIG. 4, a "convolution 32 3×3" block represents a convolution block with 32 different 3×3 convolution filter masks. This means that the block "convolution 32 3×3" generates a tensor of the input dimension m×n×c into a tensor m×n×32, where m represents the height, n the width, c the number of channels. In the case of a 2-channel input tensor with 1024×1024×2, a tensor of the dimension 1024×1024×32 results, i.e. 32 images of the dimension 1024×1024. The same applies to the other convolution blocks.

The indication "/2" in a convolution block in FIG. 4 describes a "stride" of 2. The filter core is shifted forward by 2 pixels, so that the dimension is reduced by half. The information above the blocks, e.g. "512×512" describes the dimension m×n of the tensor without the number of channels.

The indication "residual block" indicates that the output of a previous layer (1) is added to the result of an output layer (1+2) before the value is passed on via the activation function.

The CNN used is a trained or taught deep convolutional neural network. In other words, the CNN learned from examples, before the delivery of the system for detecting machining errors, which is a "good" and which is a "bad" machined workpiece surface or which is a "good" and which is a "bad" weld or solder seam. In other words, the CNN has learned to classify a machined workpiece surface as "good" or "bad" or it has learned to detect machining errors, to localize them, to classify them according to their type and to determine their size.

In the case of post-process surface inspection, the system should reliably determine whether the machined workpiece surface has machining errors. It should detect which errors are present (e.g., pore, hole, ejection, spatter, adhesion or lack of penetration or "false friend") and should localize the machining error and indicate its size on the workpiece surface. In order to train the CNN and set the hyperparameters, the CNN is provided with predetermined input tensors and corresponding output tensors. The predetermined input tensors contain the image data and the height data of a section of a machined workpiece surface as described above. A corresponding predetermined output tensor or result tensor is associated with each predetermined input tensor. This output tensor contains the desired result of the CNN for this section of the workpiece surface for the respective input tensor.

In other words, the corresponding predetermined output tensor contains information about the classification of the machining errors present on the section of the machined workpiece surface, their position and their spatial and/or planar extent. This association of an output tensor with each predetermined input tensor is done manually (so-called "labeling" of the detected image and height data). This means that there is a predetermined association of the image and height data with the result of the transfer function. For example, it is specified in the output tensor whether there is an error on the section of the machined workpiece surface represented by the input tensor, what type of error is present, at what location on the machined workpiece surface the machining error is present, for example on the basis of a two-dimensional coordinate system with x and y coordinates, and the size of the machining error in the x and y directions.

The transfer function created by the CNN is then determined by means of optimization methods and stored in the system 300, preferably in the memory of the computing unit 320. The optimization method is carried out, for example, with the "backpropagation" process with an Adam optimization. In the case of inference, the CNN provides the association of the 2-channel image with the error type, location and size.

The taught deep convolutional neural network is configured such that it can be adapted to a changed situation by means of so-called transfer learning. The basic training of the network is carried out in advance of the commissioning of the system. If the machining process is changed after commissioning, only so-called transfer learning is carried out. The changed situation may be, for example, that the workpieces to be machined change, e.g. when the material changes. The thickness of the workpiece surface or the material composition may also change slightly. Moreover, other process parameters may be used for machining the workpiece. This may cause other machining errors. For example, the probability of the different types of machining errors may change or the machining errors may be formed differently. This means that the neural network must be adapted to the changed situation and the resulting changed machining errors.

Transfer learning is similar to the initial teaching of the neural network. Typically, however, only a few specific convolution layers of the deep convolutional neural network are adapted in transfer learning, in particular the last two to three convolution layers. The number of parameters of the neural network that are changed is significantly less than during training or teaching of the neural network. This allows for transfer learning to be completed quickly at the customer, typically in less than an hour. This means that, using transfer learning, not the entire neural network is trained or taught from anew.

The system 300 may receive the training data required for transfer learning via the interface 321.

Figure 5:
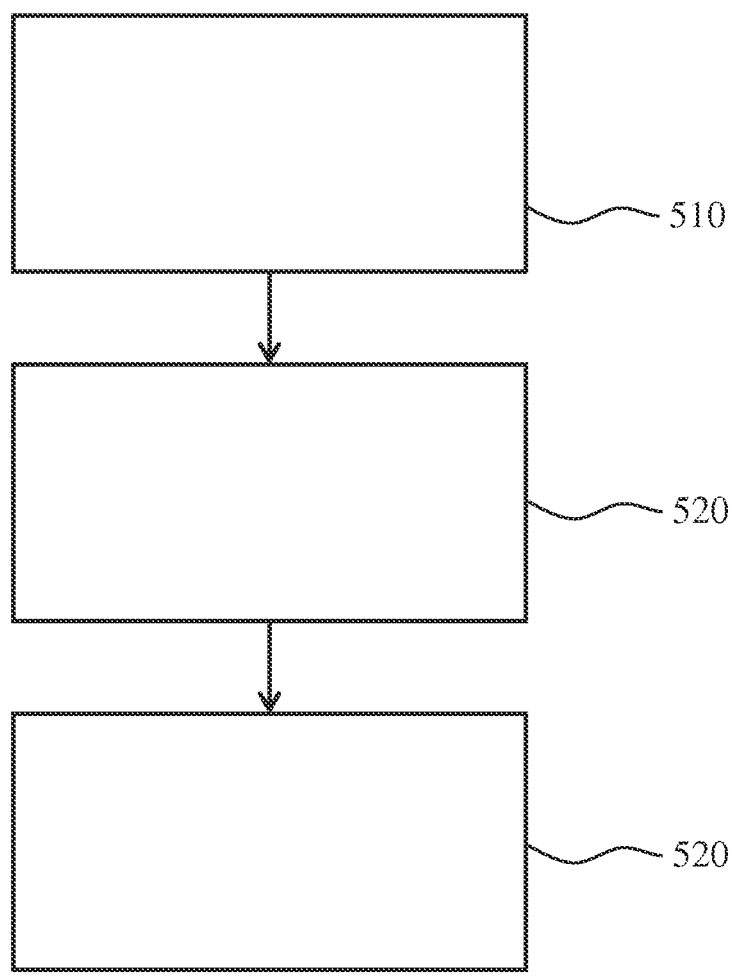
FIG. 5 shows a method for detecting machining errors according to an embodiment.

FIG. 5 shows a method for detecting a machining error in a laser machining system for machining a workpiece by means of laser beams. The first step 510 comprises detecting image data and height data of a workpiece surface machined by the laser machining system. In a second step 520, an input tensor is created based on the detected image data and height data. In step 530, based on the input tensor, a transfer function is used to determine an output tensor containing information about a machining error.

The method for detecting a machining error may already be launched while the workpiece is being machined. The method may also only be launched when the machining of the workpiece has been completed.

The method may be carried out separately or in parallel for a plurality of portions of the machined workpiece surface. According to an embodiment, the method runs through the entire machined workpiece surface once. In this case, the image and height data may only be detected once for the entire machined workpiece surface and the determination of the output tensor may only take place once for each machined workpiece.

The method may be carried out for any machined workpiece. According to an embodiment, the method may be carried out for every nth workpiece machined by the laser machining system, where n is a natural number.

The use of a neural network forming the transfer function has the advantage that the system can independently detect whether and which machining errors are present. Accordingly, it is no longer necessary for the detected sensor data, such as the image and height data, to be preprocessed in order to be accessible for error detection. Furthermore, it is not necessary to extract features characterizing the machining quality or any machining errors from the detected data. Furthermore, it is not necessary to decide which extracted features are necessary or relevant for the assessment of the machining quality or the classification of the machining errors. It is also not necessary to specify or adapt a parameterization of the extracted features for classifying the machining errors. The determination or assessment of the machining quality or the machining errors by the laser machining system is thereby simplified. The steps mentioned do not have to be carried out or attended by experts in laser machining.

The invention claimed is:

1. A system for recognizing a machining error for a laser machining system for machining a workpiece, comprising:
   an imaging device for detecting raw image data of a machined workpiece surface;
   a height sensor for detecting raw height data of a machined workpiece surface; and
   computer;
      wherein said computer is configured to create an input tensor based on the detected raw image data and raw height data, and to determine an output tensor based on the input tensor using a transfer function, the output tensor containing information about a machining error; and
      wherein said input tensor comprises a two-channel image of the raw height data and raw image data,
      wherein the transfer function between the input tensor and the output tensor is formed by a taught deep convolutional neural network,
      wherein said taught deep convolutional neural network is adaptable to a changed situation using transfer learning in advance of a commissioning of the system.

2. The system according to claim 1, wherein one or both of the imaging device and the height sensor comprises at least one of a camera system, a stereo camera system, an OCT system, and a triangulation system.

3. The system according to claim 1, wherein the raw image data correspond to a two-dimensional image of a section of the machined workpiece surface.

4. The system according to claim 1, wherein the raw height data correspond to a height geometry of the same section of the machined workpiece surface.

5. The system according to claim 1, wherein the output tensor contains one of the following pieces of information: presence of at least one machining error, type of the machining error, position of the machining error on a surface of a machined workpiece, probability of a machining error of a certain type, and spatial and/or planar extent of the machining error on the surface of the machined workpiece.

6. The system according to claim 1, wherein said computer includes an interface configured to receive training data for adapting said neural network and/or control data for determining the output tensor.

7. The system according to claim 6, wherein the interface is configured to receive said training data and said training data comprise:
   predetermined input tensors based on raw image data and raw height data of a machined workpiece surface detected by said imaging device and said height sensor; and
   predetermined output tensors which are associated with the respective input tensors and contain information about existing machining errors of the machined workpiece surface.

8. The system according to claim 1, wherein the input tensor has a dimension that is twice a number of the raw image data.

9. A laser machining system for machining a workpiece by means of a laser beam, said laser machining system comprising:
   a laser machining head for radiating a laser beam onto a workpiece to be machined; and
   a system according to claim 1.

10. A method for recognizing a machining error in a laser machining system for machining a workpiece, said method comprising the steps of:
    detecting raw image data and raw height data of a machined workpiece surface wherein raw image data is detected by an imaging device and raw height data is detected by a height sensor;
    creating an input tensor based on the detected raw image data and raw height data, wherein said input tensor comprises a two-channel image of raw data of the height data and image data; and
    determining an output tensor containing information about a machining error by means of a transfer function,
       wherein the transfer function between the input tensor and the output tensor is formed by a taught deep convolutional neural network,
       wherein said taught deep convolutional neural network is adapted to a changed situation using transfer learning in advance of a commissioning of the system performing the method.

11. The system according to claim 1, wherein said input comprises a two-channel image consisting of an incident-light image and a height image.

* * * * *